(12) United States Patent
Kenington et al.

(10) Patent No.: US 8,423,028 B2
(45) Date of Patent: Apr. 16, 2013

(54) ACTIVE ANTENNA ARRAY WITH MULTIPLE AMPLIFIERS FOR A MOBILE COMMUNICATIONS NETWORK AND METHOD OF PROVIDING DC VOLTAGE TO AT LEAST ONE PROCESSING ELEMENT

(75) Inventors: Peter Kenington, Chepstow (GB); Martin Weckerle, Ulm (DE); Dirk Neumann, Ulm (DE)

(73) Assignee: Ubidyne, Inc., Wilmington, DE (US)

( * ) Notice: Subject to any disclaimer, the term of this patent is extended or adjusted under 35 U.S.C. 154(b) by 219 days.

(21) Appl. No.: 12/648,713

(22) Filed: Dec. 29, 2009

(65) Prior Publication Data
US 2011/0159877 A1 Jun. 30, 2011

(51) Int. Cl.
*H04W 40/00* (2009.01)

(52) U.S. Cl.
USPC ..... 455/445; 455/561; 455/562.1; 370/310.2; 370/322

(58) Field of Classification Search ........ 455/561–562.1
See application file for complete search history.

(56) References Cited

U.S. PATENT DOCUMENTS

| | | | |
|---|---|---|---|
| 4,424,500 A | 1/1984 | Viola et al. | |
| 4,638,317 A | 1/1987 | Evans | |
| 5,461,389 A | 10/1995 | Dean | |
| 5,812,088 A | 9/1998 | Pi et al. | |
| 6,067,054 A | 5/2000 | Johannisson et al. | |
| 6,081,233 A | 6/2000 | Johannisson | |
| 6,094,165 A | 7/2000 | Smith | |
| 6,282,434 B1 | 8/2001 | Johannisson et al. | |
| 6,442,341 B1 | 8/2002 | Wu | |
| 6,640,110 B1 | 10/2003 | Shapira et al. | |
| 6,785,559 B1 | 8/2004 | Goldberg et al. | |
| 7,043,270 B2 * | 5/2006 | Judd et al. | 455/561 |
| 7,069,053 B2 | 6/2006 | Johannisson et al. | |
| 7,236,131 B2 | 6/2007 | Fager et al. | |
| 7,236,807 B1 * | 6/2007 | Shapira et al. | 455/562.1 |
| 7,583,982 B2 | 9/2009 | Olesen et al. | |
| 8,064,958 B2 | 11/2011 | Skarby et al. | |

(Continued)

FOREIGN PATENT DOCUMENTS
WO 99/17576 4/1999

OTHER PUBLICATIONS

U.S. Appl. No. 12/563,693, entitled: Antenna Array, Network Planning System, Communication Network and Method for Relaying Radio Signals With Independently Configurable Beam Pattern Shapes Using a Local Knowledge, Sep. 21, 2009.

*Primary Examiner* — Kiet Doan
*Assistant Examiner* — Michael T Vu
(74) *Attorney, Agent, or Firm* — Stephen H. Eland; Dann, Dorfman, Herrell & Skillman

(57) ABSTRACT

The present disclosure teaches an active antenna array for a mobile communications network. The active antenna array comprises a plurality of antenna elements, a first port, a first DC voltage supply and at least one DC voltage extractor. The plurality of antenna elements relays at least first protocol radio signals. The first port is connected to at least one individual first protocol relay path. The first port relays a general first protocol receive signal to a first protocol link. The first DC voltage supply provides a first DC voltage to at least a portion of the first protocol link. The at least one DC voltage extractor, is located in the at least one individual first protocol relay path. The DC voltage extractor extracts at least one individual DC voltage to supply an at least one amplifier.

24 Claims, 5 Drawing Sheets

U.S. PATENT DOCUMENTS

| | | |
|---|---|---|
| 8,208,962 B2 | 6/2012 | Thomas |
| 8,228,840 B2 | 7/2012 | Skarby |
| 8,320,825 B2 | 11/2012 | Goransson et al. |
| 2004/0204109 A1* | 10/2004 | Hoppenstein .............. 455/562.1 |
| 2008/0254845 A1 | 10/2008 | Chang et al. |
| 2008/0318632 A1 | 12/2008 | Rofougaran et al. |
| 2009/0181722 A1 | 7/2009 | Stensson |

* cited by examiner

US 8,423,028 B2

ACTIVE ANTENNA ARRAY WITH MULTIPLE AMPLIFIERS FOR A MOBILE COMMUNICATIONS NETWORK AND METHOD OF PROVIDING DC VOLTAGE TO AT LEAST ONE PROCESSING ELEMENT

CROSS-REFERENCE TO RELATED APPLICATIONS

The present application is related to U.S. patent application Ser. No. 12/648,773 entitled "Active Antenna Array and Method for relaying first and second Protocol Radio Signals in a Mobile Communications Network" filed Dec. 29, 2009, which is incorporated in its entirety. The present application is further related to U.S. patent application Ser. No. 12/648, 852 entitled "Active Antenna Array for a Mobile Communications Network with Multiple Amplifiers Using Separate Polarisations for Transmission and a Combination of Polarisations for Reception of Separate Protocol Signals" filed Dec. 29, 2009, which is incorporated in its entirety. The present application is further related to U.S. patent application Ser. No. 12/648,809 entitled "A Method and Apparatus for Tilting Beams in a Mobile Communications Network" filed Dec. 29, 2009, which is incorporated in its entirety.

FIELD OF THE INVENTION

The field of the invention relates to an active antenna array for a mobile communications network and a method of providing a DC voltage to at least one processing element of an active antenna array for a mobile communications network.

BACKGROUND OF THE INVENTION

The use of mobile communications networks has increased over the last decade. Operators of mobile communications networks have increased the number of base stations in order to meet an increased request for service by users of such networks. The operators of the mobile communications networks wish to reduce the running costs of the base station. It is one option to implement the radio system as an antenna-embedded radio forming an active antenna array of the present disclosure. The antenna-embedded radio may be implemented on a chip, at least for some of the components of the antenna-embedded radio. The antenna-embedded radio reduces space needed to house the hardware components of the base station. Power consumption during normal operation of the active antenna array is reduced when implementing the active antenna array using one or more chips.

Mobile communications networks use protocols when relaying radio signals. Examples of protocols for mobile communications system include the GSM protocol but are not limited thereto.

New types of protocols for radio signals (or pertaining to radio signals) in mobile communication networks have been developed in order to meet an increased need of mobile communication and to provide higher data rates to hand sets as well as an increased flexibility in adapting radio signals relayed by the active antenna array to specific needs of an individual site or cell of the mobile communications network.

An example for a newer type of protocol for protocol radio signals is the unified mobile telecommunication service protocol (UMTS), third generation long term evolution (3GLTE) protocol, freedom of mobile multi media access radio (FMRA) protocol, wideband code division multiple access (WCDMA) protocol, and Worldwide Interoperability for Microwave Access (WiMAX) but is not limited thereto.

Radio signals using the first type of protocol shall be referred to herein as first protocol radio signals. Radio signals using the second newer type of protocol shall be referred to herein as second protocol radio signals.

The operators of the mobile telecommunications networks are interested in supporting the first protocol radio signals and the second protocol radio signals. Therefore an interest exists to provide active and/or passive antenna arrays relaying both the first protocol radio signals and the second protocol radio signals.

The second protocol radio signals often require flexibility in beam shaping not often required with the first protocol radio signals.

In the prior art it was possible to provide an active antenna array for the second protocol radio signals and a further antenna array relaying the first protocol radio signals. Such an approach is rather expensive for the operators of the mobile communications network as two separate sets of antenna arrays need to be setup and maintained.

Combined passive antenna arrays for mobile communication networks are known that relay both the first protocol radio signals and the second protocol radio signals concurrently. These combined antenna arrays of the prior art unfortunately do not provide the increased flexibility in terms of beam shaping as is often required with active arrays.

FIG. 1 shows a passive antenna array 1$a$ of the prior art. The passive antenna array 1$a$ of the prior art is adapted to relay two different air interface standards. One of the air interface standards is the first protocol, for example GSM or UMTS but not limited thereto, and another one of the air interface standards is the second protocol, for example UMTS, but is not limited thereto.

The first protocol radio signal comprises a general first protocol transmit signal 70Tx and a general first protocol receive signal 70Rx. The second protocol radio signal comprises a general second protocol transmit signal 75Tx and a general second protocol receive signal 75Rx. The general first protocol transmit signal 70Tx and the general first protocol receive signal are present between a first protocol base transceiver station (BTS) 10-1 and a duplexer 20. The general second protocol transmit signal 75Tx and the general second protocol receive signal 75Rx are present between a second protocol base transceiver station (BTS) 10-2 and the duplexer 20. The duplexer 20 combines the general first protocol transmit signal 70Tx and the general second protocol transmit signal 75Tx with a low combiner loss. The low combiner loss is much lower than a loss present with a −3 dB hybrid or Wilkinson combiner. It is a disadvantage of the duplexer 20 to require a roll-off band between the general first protocol transmit signal 70Tx and the general second protocol transmit signal 75Tx as well as between the general first protocol receive signal 70Rx and the general second protocol receive signal 75Rx. The duplexer 20 separates a general first protocol receive signal 70Rx and a general second protocol receive signal 75Rx such that the general first protocol receive signal 70Rx reaches the first protocol BTS 10-1 and the general second protocol receive signal 75Rx reaches the second protocol BTS 10-2.

The required roll-off wastes bandwidth as the roll-off band is within bandwidth of the first protocol radio signals and bandwidth of the second protocol radio signals. Therefore it is expensive to use the duplexer 20 in terms of spectrum license fees, as the license fees also need to be paid for the roll-off band of the duplexer 20. The duplexer 20 is further inflexible with respect to frequency bandwidths for the first protocol radio signals and the second protocol radio signals. The bandwidth allocated to the first protocol radio signal and a bandwidth allocated to the second protocol radio signal are in the prior art fixed.

A DC voltage adder 215 is located between the duplexer 20 and a tower mounted amplifier (TMA) 80. The DC voltage adder 215 is capable of adding a DC voltage to a signal path relaying radio frequency signals. The advantage of using the DC voltage adder 215 between the duplexer 20 and the TMA 80 is that a length of a DC connection from a first DC voltage supply 202 to the TMA 80 can be reduced. Typically the TMA 80 is mounted on a tower. Hence the cable from the duplexer 20 to the TMA 80 may be several meters long or even substantially longer. It will be appreciated that long DC lines add to overall costs of the active antenna array and may be vulnerable to any radio frequency (RF) impinging thereon.

The DC voltage adder 215 may be implemented using the bias T as known in the art, or so called RF chokes using an inductance tailored such that RF frequency travelling along the coaxial cable may not pass via the DC voltage adder 215 back into the DC supply 202. Conversely, the first DC voltage 205 is capable of passing through the DC voltage adder 215. The DC voltage adder 215 is of low impedance to the DC voltage but of high impedance to any RF signal relayed along the coaxial cable. Typically the duplexer 20 does not have DC conductivity. Hence the DC voltage adder 215 needs to be present downstream of the duplexer 20. Otherwise the first DC voltage 205 provided by the first DC voltage supply 202 will not reach the TMA 80 from which the DC voltage is supplied to power amplifiers or any other active components within the TMA 80.

A passive feeder network forwards the general first protocol transmit signal 70Tx and the general second protocol transmit signal 75Tx from the TMA 80 to the antenna array 1. The passive feeder network further forwards a general first protocol receive signal 70Rx, and the second protocol receive signal 75Rx from the passive antenna array 1a to the TMA 80. The general first protocol transmit signal 70Tx is split into individual first protocol transmit signals 70Tx-1, 70Tx-2, . . . , 70Tx-N at a port 11 of the antenna array 1a reaching an individual one of the antenna elements Ant-1, Ant-2, . . . , Ant-N of the antenna array 1a. In FIG. 1 only 16 of the antenna elements Ant-1, Ant-2, . . . , Ant-N are shown. A corporate feed network may be used for splitting the general first protocol transmit signal 70Tx into the individual first protocol transmit signals 70Tx-1, 70Tx-2, . . . , 70Tx-N. The corporate feed network is illustrated in FIG. 1 by the thick black lines within the body of the passive antenna array 1a. The individual first protocol transmit signal 70Tx-1, 70Tx-2, . . . , 70Tx-N is only shown for the individual antenna elements Ant-1 and Ant-16 in FIG. 1 for the sake of clarity. The individual transmit signal 70Tx-1, 70Tx-2, . . . , 70Tx-N is typically present for each one of the antenna elements Ant-1, Ant-2, . . . , Ant-N. It is also conceivable that the individual first protocol transmit signals 70Tx-1, 70Tx-2, . . . , 70Tx-N are not present for each of the antenna elements Ant-1, Ant-2, . . . , Ant-N. In this case not all of the antenna elements Ant-1, Ant-2, . . . , Ant-N are transmitting.

The general second protocol transmit signal 75Tx is split into a plurality individual second protocol transmit signals 75Tx-1, 75Tx-2, . . . , 75Tx-N reaching the individual antenna element Ant-1, Ant-2, . . . , Ant-N of the antenna array 1a. The individual second protocol transmit signal 75Tx-1, 75Tx-2, . . . , 75Tx-N is only shown for the individual antenna elements Ant-1 and Ant-16 in FIG. 1 for the sake of clarity but may be present for more than two of the antenna elements Ant-1, Ant-2, . . . , Ant-N.

SUMMARY OF THE INVENTION

The present disclosure teaches an active antenna array for a mobile communications network. The active antenna array comprises a plurality of antenna elements, at least one first port, a first DC voltage supply and at least one DC voltage extractor. The plurality of antenna elements relays at least first protocol radio signals. The first port is connected to at least one individual first protocol relay path. The first port relays a general first protocol receive signal to a first protocol link. The first DC voltage supply provides a first DC voltage to at least a portion of the first protocol link. The at least one DC voltage extractor is located in the at least one individual first protocol relay path. The DC voltage extractor is adapted to extract at least one individual DC voltage to supply an at least one signal processing element. The at least one signal processing element is located in the at least one individual first protocol relay path.

The term "individual first protocol relay path" as used herein shall be construed as a path along which first protocol signals for an individual one of the plurality of antenna elements are relayed. The individual relay path runs from the first port to a selected one of the individual antenna elements. The individual first protocol relay path may be used for a receiving of first protocol receive signals and/or a transmitting of first protocol transmit signals.

The term "signal processing element" as used herein shall be construed as an element performing a signal processing, such as amplification, digital/analogue conversion, analogue/digital conversion, up/down conversion, crest factor reduction but is not limited thereto. The signal processing element of the present disclosure will be explained herein using the example of an amplifier implementing the signal processing element.

The term "first protocol link" as used herein may comprise a coaxial cable but is not limited thereto. The first protocol link is adapted to relay a first protocol transmit signal to the first port. The first protocol link may further be adapted to relay a first protocol receive signal from the first port to a first protocol receiver (not shown).

The term "first protocol" pertaining to first protocol radio signals as used herein shall be construed as comprising the GSM protocol and the unified mobile telecommunication service protocol (UMTS) but is not limited thereto.

The term "second protocol" pertaining to a second protocol radio signal as used herein shall be construed as the UMTS protocol, a third generation long term evolution (3 GLTE) protocol, a freedom of mobile multimedia access radio (FMRA) protocol and a wideband code division multiple access (WCDMA) protocol but is not limited thereto.

It is conceivable that a protocol which is a member of the group of first protocols may also be a member of the second group of protocols. The presence of a specific protocol in both, the group of first protocols and the group of second protocols, may be relevant when using different variants of a protocol, such as UMTS and UMTS900 but is not limited thereto.

The term "phase weighting, amplitude weighting or delay" shall be construed as comprising a phase weighting, an amplitude weighting or a delay as provided by passive networks known in the art. The phase weighting, the amplitude weighting or the delay may comprise a set of possible parameter values for at least one of the phase weighting, the amplitude weighting or the delay. Typically, the passive networks known in the art prevent an arbitrary selection of the phase weighting, the amplitude weighting or the delay. Remote electrical tilt (RET) systems utilise electro-mechanically variable phase shift elements to vary a beam pattern relayed by the prior art antenna array 1*a*. RET systems will act on all transmit signals fed to the prior art antenna 1*a* and will not act separately for first protocol transmit signals 70Tx-1, 70Tx-2, . . . , 70Tx-N and second protocol transmit signals 75Tx-1, 75Tx-2, . . . , 75Tx-N. The phase weighting, the amplitude weighting or the delay are applied by analogue means.

The term "the variable phase weighting, the variable amplitude weighting or the variable delay" as used herein shall be construed as comprising not only a fixed set of possible parameter values for at least one of the variable amplitude weighting, the variable phase weighting and the variable delay. The variable phase weighting, the variable amplitude weighting or the variable delay provide an arbitrary selection of at least one of the phase weighting, the amplitude weighting or the delay between individual ones of the antenna elements. The variable phase weighting, the variable amplitude weighting or the variable delay may comprise a variation in time of at least one of the phase weighting, the amplitude weighting or the delay between the individual ones of the antenna elements. The variable phase weighting, the variable amplitude weighting or the variable delay are applied digitally. The variable phase weighting, the variable amplitude weighting or the variable delay may comprise a variation in time of at least one of the phase weighting, the amplitude weighting or the delay between the individual ones of the antenna elements.

The variable phase weighting, the variable amplitude weighting may also be provided by the multiplication of the relevant transmit and/or receive signal by 'beamforming vectors'. The 'beamforming vectors' are sets of coefficients which, when multiplied with the relevant transmit and/or receive signal, produce the required degree of at least one of the variable phase weighting, the variable amplitude weighting or the variable delay between individual ones of the antenna elements. Such multiplication may be provided vectorially, in either polar (amplitude and phase) format or in Cartesian (I/Q) format. In all cases, within the present disclosure, whenever (variable) phase weighting, (variable) amplitude weighting or (variable) delay are discussed, the use of 'beamforming vectors' to generate such modifications is explicitly included. Details about the concept of 'beamforming vectors' are given in an earlier application U.S. Ser. No. 12/563,693 entitled "Antenna array, network planning system, communication network and method for relaying radio signals with independently configurable beam pattern shapes using a local knowledge"; which is incorporated herein in its entirety.

The term "receive direction" as used herein shall be construed as a direction running from an individual antenna element to the signal processing element. In other words the receive direction describes a direction in which receive signals travel after being received by the antenna element.

The term "transmit direction" as used herein shall be construed as running from the first port to a second splitter, further to a first coupler, from there to the first splitter reaching the antenna element. In other words the transmit direction describes a direction along which transmit signals travel from the first port until the transmit signals are transmitted by the antenna element.

The term "first protocol radio signal" shall be construed comprising at least one of a general first protocol transmit signal 70Tx, a general first protocol receive signal 70Rx, and an at least one individual first protocol transmit signal 70Tx-1, 70Tx-2, . . . , 70Tx-N and the at least one individual first protocol receive signal 70Rx-1, 70Rx-2, . . . , 70Rx-N.

The term "second protocol radio signal" shall be construed comprising at least one of a general second protocol transmit signal 75Tx, a general second protocol receive signal 75Rx, an at least one individual second protocol transmit signal 75Tx-1, 75Tx-2, . . . , 75Tx-N and the at least one individual second protocol receive signal 75Rx-1, 75Rx-2, . . . , 75Rx-N.

The present disclosure further teaches a method of providing a DC voltage to at least one signal processing element of an active antenna array for a mobile communications network. The signal processing element may be implemented as an amplifier. The method comprises a step of providing a first DC voltage. The method further comprises an adding of the first DC voltage to at least one portion of a first protocol relay path. The method comprises a step of extracting at least one individual DC voltage from at least one individual first protocol relay path for supplying the at least one signal processing element. The method further comprises a step of concurrently receiving at least one individual first protocol receive signal and at least one individual second protocol receive signal.

The present disclosure further teaches a computer program product comprising a computer useable medium having a control logic stored therein for causing a computer to manufacture the active antenna array for a mobile communications network of the present disclosure.

The present disclosure further teaches a computer program product comprising a computer useable medium have an control logic stored therein for causing a computer to execute the method for relaying first protocol radio signals and second protocol radio signals in a mobile communications network.

DETAILED DESCRIPTION OF THE INVENTION

Figure 2:
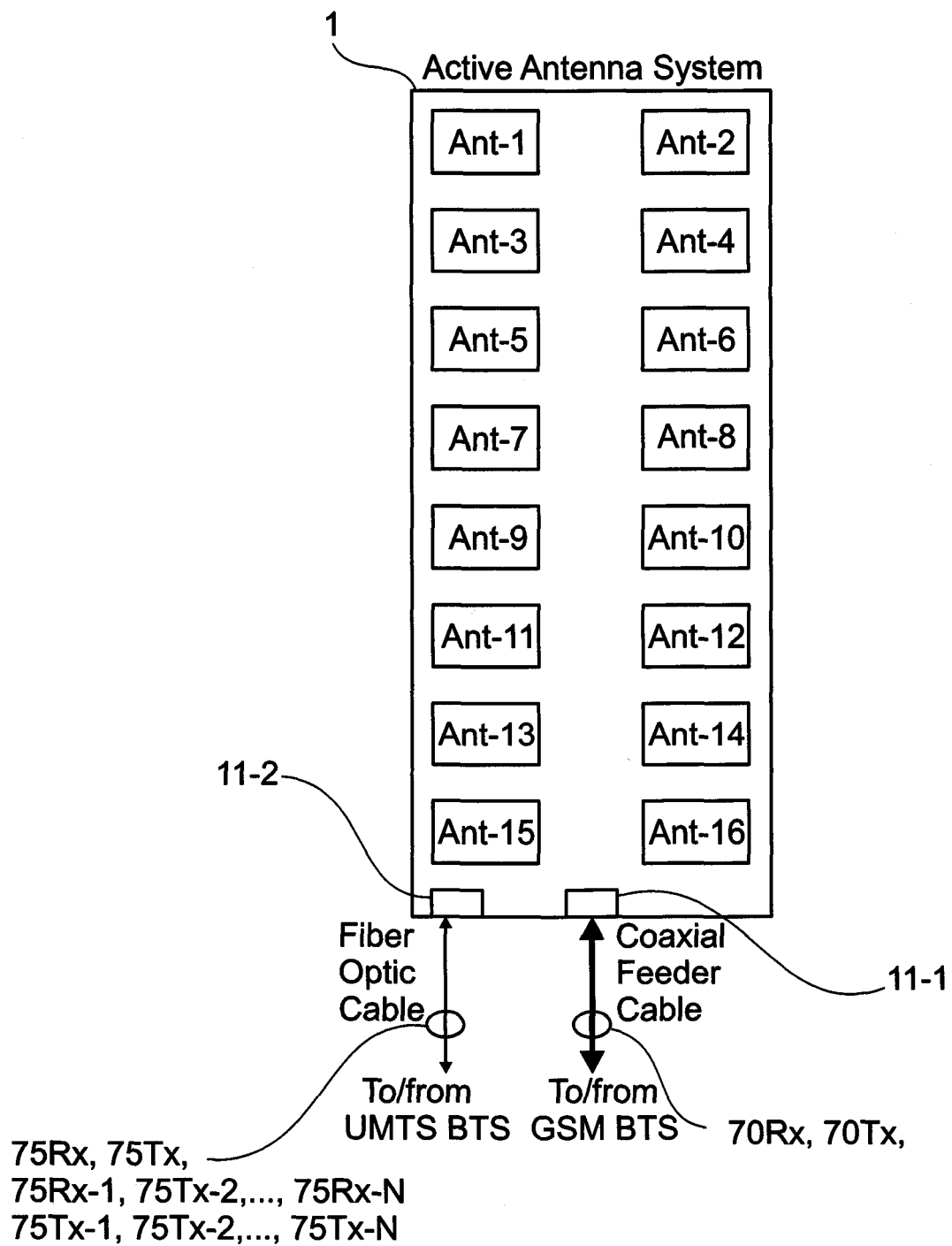
FIG. 2 shows the active antenna array

FIG. 2 shown an outline of the active antenna array 1 of the present disclosure. The active antenna array 1 allows an existing first protocol BTS 10-1 to be used with an antenna embedded radio for the second protocol radio signals, such as the UMTS protocol. The active antenna array 1 has two ports. The first port 11-1 is fed with the general first protocol transmit signal 70Tx. It will be noted that there may be more than one of the first port 11-1, for example if the active antenna array 1 incorporates a receive diversity as known in the art.

The first port 11-1 further provides the general first protocol receive signal 70Rx. Typically a coaxial cable is connected to the first port 11-1. The example of the coaxial cable corresponds to the first protocol link. The coaxial cable ending at the first port 11-1 carries the general first protocol transmit signal 70Tx and the general first protocol receive signal 70Rx. The first protocol transmit signal 70Tx is typically substantially higher in power than the general receive signal 70Rx. There may be two or more orders of magnitude in power between the general first protocol transmit signal 70Tx and the general first protocol receive signal 75Rx.

A second port 11-2 is a digital port, for example interfacing with a fibre-optic cable. The fibre-optic cable carries the second protocol radio signals. The second protocol signals are typically provided at digital baseband. Active electronics in the active antenna array 1 performs functions including: Crest factor reduction, beamforming, predistortion, up conversion/down conversion to/from radio frequency (RF), power amplification etc. Without any limitation the second protocol signals may be provided at an intermediate frequency band between the base band and a transmit frequency band of the active antenna array 1.

As mentioned before the second protocol signals comprise the general second protocol transmit signal 75Tx and the general second protocol receive signal 75Rx. Without any limitation it is possible for the second port 11-2 to receive the individual second protocol transmit signals 75Tx-1, 75Tx-2, ..., 75Tx-N and/or the general second protocol transmit signal 75Tx. It is also possible for the second port 11-2 to provide the individual second protocol receive signals 75Rx-1, 75Rx-2, ..., 75Rx-N and/or the general second protocol receive signal 75Rx, as shall be explained further down.

The individual second protocol transmit signals 75Tx-1, 75Tx-2, ..., 75Tx-N are forwarded to the individual one of the antenna elements Ant-1, Ant-2, ..., Ant-N as will be explained below. Likewise the individual second protocol receive signals 75Rx-1, 75Rx-2, ..., 75Rx-N are received at the individual one of the antenna elements Ant-1, Ant-2, ..., Ant-N and forwarded to a second protocol receiver 210 (see FIG. 3). The fibre-optic cable may carry the second protocol signals in an open base station architecture initiative (OBSAI) format or a common public radio interface (CPRI) format, but is not limited thereto. The fibre-optic cable ending at the second port 11-2 may be used to relay second protocol signals to and from active circuits within the active antenna array 1, as will be explained later. The fibre-optic cable may be replaced by any other suitable link and is only given as one example of the suitable link ending at the second port 11-2.

Figure 3:
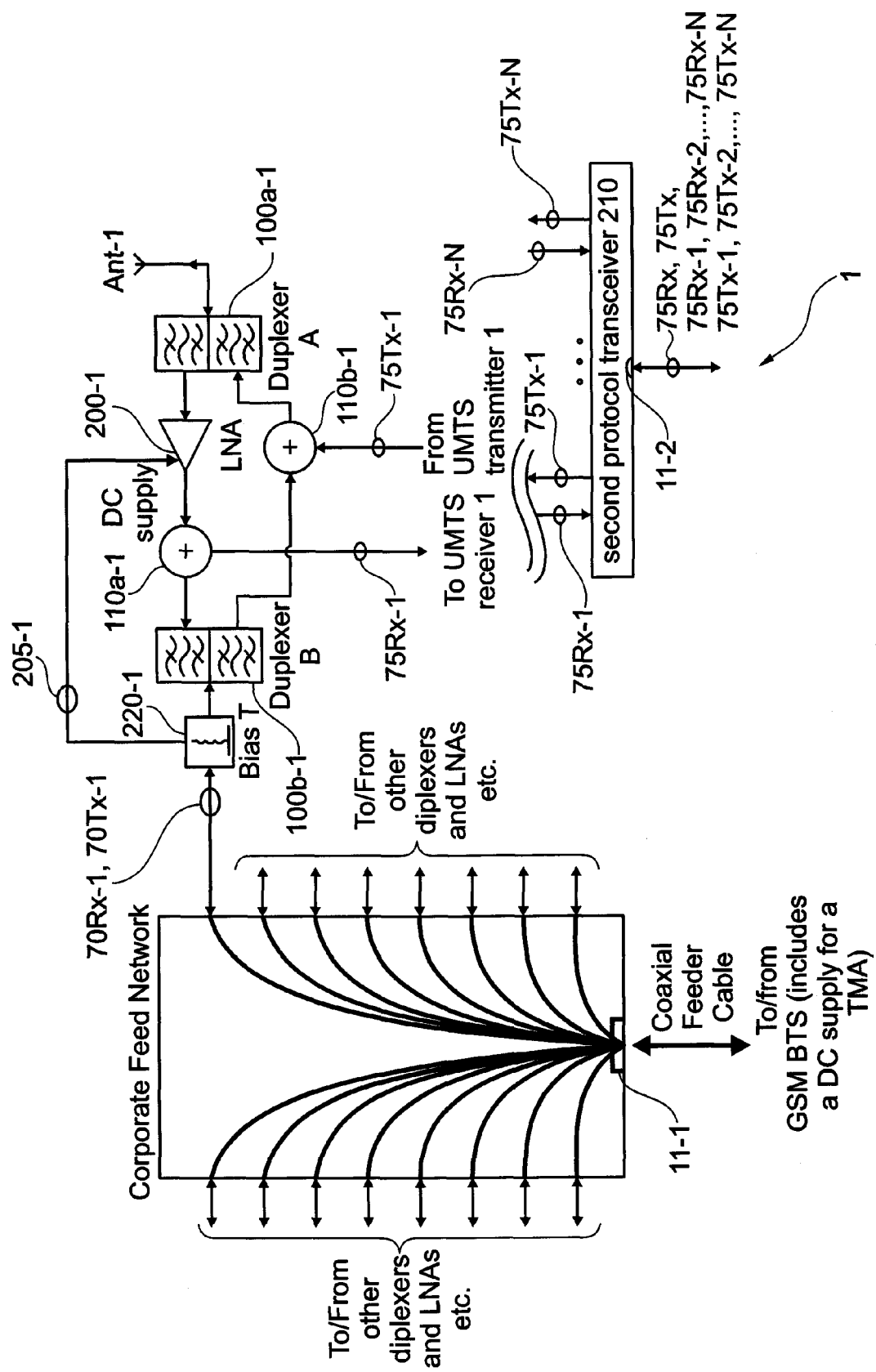
FIG. 3 shows details of the active antenna array for an individual one of the antenna elements

FIG. 3 shows details of the active antenna array 1 of the present disclosure.

The individual antenna element Ant-1, Ant-2, ..., Ant-N receives an individual first protocol receive signal 70Rx-1, 70Rx-2, ..., 70Rx-N and/or an individual second protocol receive signal 75Rx-1, 75Rx-2, ..., 75Rx-N both of which are filtered by a first splitter 100a-1, 100a-2, ..., 100a-N. The first splitter 100a-1, 100a-2, ..., 100a-N may be implemented as a duplexer, a quadrature hybrid, a directional coupler or a circulator, but is not limited thereto. The first splitter 100a-1, 100a-2, ..., 100a-N substantially hinders the individual first protocol receive signal 70Rx-1, 70Rx-2, ..., 70Rx-N and/or the individual second protocol receive signal 75Rx-1, 75Rx-2, ..., 75Rx-N from entering a transmit path reaching the first combiner 110b-1, 110b-2, ..., 110b-N. Any receive signals entering the transmit path will results in a loss in signal strength of the individual first protocol receive signal 70Rx-1, 70Rx-2, ..., 70Rx-N and/or the second protocol receive signal 75Rx-1, 75Rx-2, ..., 75Rx-N reaching the signal processing element 200-1, 200-2, ..., 200-N, for example implemented as the amplifier. The first splitter 100a-1, 100a-2, ..., 100a-N forwards the individual first protocol receive signal 70Rx-1, 70Rx-2, ..., 70Rx-N and/or the individual second protocol receive signal 75Rx-1, 75Rx-2, ..., 75Rx-N to the signal processing element/the amplifier 200-1, 200-2, ..., 200-N downstream of the first splitter 100a-1, 100a-2, ..., 100a-N along the receive direction. The amplifier 200-1, 200-2, ..., 200-N amplifies the individual first protocol receive signal 70Rx-1, 70Rx-2, ..., 70Rx-N and/or the individual second protocol receive signal 75Rx-1, 75Rx-2, ..., 75Rx-N.

The signal processing element 200-1, 200-2, ..., 200-N is provided with an individual DC voltage 205-1, 205-2, ..., 205-N. As known in the prior art the DC voltage adder 215 (see FIG. 1) may be used along the first protocol link (i.e. the coaxial cable) to add the first DC voltage 205 to the first protocol link ending at the first port 11-1. The first DC voltage 205 provided by the first DC voltage supply 202 is split at the first port 11-1 providing an individual DC voltage 205-1, 205-2, ..., 205-N to one or more of the individual first protocol relay paths. The passive feeder network from the first port 11-1 branching into individual first protocol relay paths will forward the individual DC voltage 205-1, 205-2, ..., 205-N to the individual first protocol relay paths. A DC voltage extractor 220-1, 220-2, ..., 220-N extracts an individual DC voltage 205-1, 205-2, ..., 205-N and provides the individual DC voltage 205-1, 205-2, ... 205-N to the signal processing element/the amplifier 200-1, 200-2, ..., 200-N.

Using the DC voltage adder 215 and the DC voltage extractor 220-1, 220-2, ..., 220-N reduces an amount of required DC lines for supplying the amplifiers 200-1, 200-2, ..., 200-N. Otherwise an individual DC line carrying the individual DC voltage 205-1, 205-2, ..., 205-N to the amplifier 200-1, 200-2, ..., 200-N would be required. The individual DC lines would add to the cost and weight of the active antenna array 1. Furthermore the individual DC lines will be susceptible to any high-power RF transmit signals impinging on the individual DC lines. Furthermore when using several individual DC lines it may prove difficult to assure a common ground for all the individual DC lines; hence causing unwanted ground loops. The unwanted ground loops may receive an RF signal from radio signals relayed by the active antenna system 1. Therefore the individual DC voltage 205-1, 205-2, ..., 205-N supplying the amplifier 200-1, 200-2, ..., 200-N may be substantially distorted by the RF signals received by the DC lines, which may possibly cause the amplifier 200-1, 200-2, ..., 200-N to introduce distortion products or spurious products into the first and/or second protocol received signals.

A first coupler 110a-1, 110a-2, ..., 110a-N splits the individual first protocol receive signal 70Rx-1, 70Rx-2, ..., 70Rx-N and/or the individual second protocol receive signal 75Rx-1, 75Rx-2, ..., 75Rx-N into two paths. A first path goes to a second splitter 100b-1, 100b-2, ..., 100b-N. The second path goes from the first coupler 110a-1, 110a-2, ..., 110a-N to the second protocol receiver 210 for the individual one of the antenna element Ant-1, Ant-2, ..., Ant-N. There may be an individual second protocol receiver for one or more of the antenna elements Ant-1, Ant-2, ..., Ant-N. Alternatively, the second protocol receiver 210 may comprise an individual second protocol receiver for one or more of the individual second protocol receive signals 75Rx-1, 75Rx-2, ..., 75Rx-N.

It is further conceivable that the second protocol receiver is implemented as a second protocol transceiver. The second protocol transceiver may comprise an individual second protocol receiver for each one of the individual second protocol receive signals 75Rx-1, 75Rx-2, ..., 75Rx-N. Alternatively, the second protocol transceiver may be implemented comprising a receiver for two or more of the individual second protocol receive signals 75Rx-1, 75Rx-2, ..., 75Rx-N.

The second protocol transceiver provides at least one of the individual second protocol transmit signals 75Tx-1, 75Tx-2, ..., 75Tx-N.

The first path reaches the second splitter 100b-1, 100b-2, ..., 100b-N so that the individual first protocol receive signals 70Rx-1, 70Rx-2, ..., 70Rx-N are combined by the passive feeder network or the passive feeder cable providing the general first protocol receive signal 70Rx at the first protocol link connected to the first port 11-1. It will be noted that the passive feeder network may comprise passive phase shift element and/or passive delay elements. The passive phase shift element and/or the passive delay element may be implemented using coaxial lines and/or discrete elements or subsystems. It may be necessary to apply a filter (not shown) to the general first protocol receive signals 70Rx in order to eliminate any components of the second protocol receive signal 75Rx-1, 75Rx-2, . . . , 75Rx-N. Without any limitation the second splitter 100b-1, 100b-2, . . . , 100b-N may provide the filtering such that individual second protocol receive signals 75Rx-1, 75Rx-2, . . . , 75Rx-N are removed and only the first protocol receive signal 70Rx-1, 70Rx-2, . . . , 70Rx-N is forwarded to the feeder network ending at the first port 11-1. The second splitter 100b-1, 100b-2, . . . , 100b-N may comprise a duplexer, a circulator, a directional coupler, a quadrature hybrid, as already mentioned for the first splitter 100a-1, 100a-2, . . . , 100a-N.

The second signal path from the first coupler 110a-1, 110a-2, . . . , 110a-N to the respective second protocol receiver or the second protocol receiver 210 may require a filtering process to remove any components of the first protocol receive signal 70Rx-1, 70Rx-2, . . . , 70Rx-N. Filters adapted for this filtering are known in the art and not shown in FIG. 3.

The active antenna array 1 of the present disclosure is described in FIG. 3 using an example of an active transmit and receive antenna array 1. It is conceivable for the active antenna array 1 to comprise only a receive functionality. For a receive only aspect of the active antenna array 1, there will be no radio signals transmitted by the active antenna array 1, as will be described next.

A general first protocol transmit signal 70Tx is forwarded by the first protocol link (i.e. coaxial cable) to the first port 11-1 and split into individual first protocol transmit signals 75Tx-1, 75Tx-2, . . . , 75Tx-N by the passive feeder network and relayed by the individual antenna arrays Ant-1, Ant-2, . . . , Ant-N. The passive feeder network provides a 1:M relation between the general first protocol transmit signal 70Tx to the individual antenna elements Ant-1, Ant-2, . . . , Ant-N. M may be greater than one in the active antenna array 1. M may further match a number N of antenna elements Ant-1, Ant-2, . . . , Ant-N present in the active antenna array 1 or any other positive integer value.

It will be noted that the individual first protocol transmit signal 70Tx-1, 70Tx-2, . . . , 70Tx-N is only shown for an individual one of the antenna elements Ant-1, Ant-2, . . . , Ant-N. In FIG. 3 the individual first protocol transmit signal 70Tx-1 is shown for the antenna element Ant-1 only. For each one of the antenna elements Ant-2, . . . , Ant-N a corresponding arrangement may be used. The individual first protocol transmit signal 70Tx-1, 70Tx-2, . . . , 70Tx-N is forwarded to a second splitter 100b-1, 100b-2, . . . , 100b-N. The second splitter 100b-1, 100b-2, . . . , 100b-N forwards the individual first protocol transmit signal 70Tx-1, 70Tx-2, . . . , 70Tx-N in a transmit direction ending at the individual antenna element Ant-1, Ant-2, . . . , Ant-N. The second splitter 100b-1, 100b-2, . . . , 100b-N substantially attenuates any portion of the individual first protocol transmit signal 70Tx-1, 70Tx-2, . . . , 70Tx-N leaking into the receive path, possibly causing damage and/or distortion within the amplifier 200-1, 200-2, . . . , 200-N. The individual first protocol transmit signals 70Tx-1, 70Tx-2, . . . , 70Tx-N travels to a second coupler 110b-1, 110b-2, . . . , 110b-N. The second coupler 110b-1, 110b-2, . . . , 110b-N adds the individual second protocol transmit signal 75Tx-1, 75Tx-2, . . . , 75Tx-N to the individual first protocol transmit signal 70Tx-1, 70Tx-2, . . . , 70Tx-N. The individual first protocol transmit signal 70Tx-1, 70Tx-2, . . . , 70Tx-N and the individual second protocol transmit signal 75Tx-1, 75Tx-2, . . . , 75Tx-N are forwarded to the first splitter 100a-1, 100a-2, . . . , 100a-N. The first splitter 100a-1, 100a-2, . . . , 100a-N forwards the individual first protocol transmit signal 70Tx-1, 70Tx-2, . . . , 70Tx-N and the individual second protocol transmit signal 75Tx-1, 75Tx-2, . . . , 75Tx-N to the individual antenna element Ant-1, Ant-2, . . . , Ant-N. This is shown in FIG. 3 for the antenna element Ant-1 only. The first coupler 100a-1, 100a-2, . . . , 100a-N substantially attenuates any of the individual first protocol transmit signal 70Tx-1, 70Tx-2, . . . , 70Tx-N or the individual second protocol transmit signal 75Tx-1, 75Tx-2, . . . , 75Tx-N from entering the amplifier 200-1, 200-2, . . . , 200-N in the receive direction, possibly causing damage and/or distortion within the amplifier 200-1, 200-2, . . . , 200-N.

Let us now consider the general first protocol transmit signal 70Tx arriving at the first port 11-1. The general first protocol transmit signal 70Tx is forwarded using a high power RF coaxial cable to the active antenna array 1 on the first protocol link 11-1. The high power RF coaxial cable also carries the general first protocol receive signal 70Rx at a low power level, as explained earlier. Individual ones of the first protocol transmit signal 70Tx-1, 70Tx-2, . . . , 70Tx-N are derived using the passive feeder network from the input 11-1 to the individual antenna elements Ant-1, Ant-2, . . . , Ant-N when the general first protocol transmit signal reaches the first port 11-1, as already explained in connection with the FIG. 1.

Such a passive distribution of the first protocol radio signals is not normally included in the active antenna array of the prior art relaying the second protocol radio signals. Therefore the passive distribution of the first protocol radio signals would need to be added if the active antenna array 1 was adapted to accommodate a relaying of both the first protocol radio signals and the second protocol radio signals as with the present disclosure.

In an antenna array 1a of the prior art (see FIG. 1) the individual first protocol transmit signal 70Tx-1, 70Tx-2, . . . , 70Tx-N would immediately reach the individual antenna element Ant-1, Ant-2, . . . , Ant-N.

The second splitter 100b-1, 100b-2, . . . , 100b-N separates the individual first protocol transmit signals 70Tx-1, 70Tx-2, . . . , 70Tx-N from any receive signals. The receive signals may comprise the individual first protocol receive signal 70Rx-1, 70Rx-2, . . . , 70Rx-N and/or the individual second protocol receive signal 75Rx-1, 75Rx-2, . . . , 75Rx-N that were amplified by the amplifier 200-1, 200-2, . . . , 200-N.

The individual first protocol transmit signal 75Tx-1, 75Tx-2, . . . , 75Tx-N is combined with the individual second protocol transmit signal 75Tx-1, 75Tx-2, . . . , 75Tx-N from a respective second protocol transmitter (not shown) present in the active antenna array 1. The respective second protocol transmitter may be co-located with the second protocol receiver when implemented as the second protocol transceiver 210. A combination of the individual first protocol transmit signal 70Tx-1, 70Tx-2, . . . , 70Tx-N and the individual second protocol transmit signal 75Tx-1, 75Tx-2, . . . , 75Tx-N may be achieved using a second coupler 110b-1, 110b-2, . . . , 110b-N in FIG. 3. The second coupler 110b-1, 110b-2, . . . , 110b-N could be a filter combiner, which would be of low loss, a hybrid combiner or a Wilkinson combiner. hybrid combiner or the Wilkinson combiner having a higher loss, but is not limited thereto. The individual first protocol transmit signal 70Tx-1, 70Tx-2, . . . , 70Tx-N and the individual second protocol transmit signal 75Tx-1, 75Tx-2, . . . , 75Tx-N are forwarded to the first splitter 100a-1, 100a-2, . . . , 100a-N connecting the individual first protocol transmit signal 70Tx-1, 70Tx-2, . . . , 70Tx-N and/or the individual second protocol transmit signal 75Tx-1, 75Tx-2, . . . , 75Tx-N to the individual antenna element Ant-1, Ant-2, . . . , Ant-N. In FIG. 3 the individual antenna element is Ant-1. The individual antenna element Ant-1, Ant-2, . . . , Ant-N transmits the individual first protocol transmit signal 70Tx-1, 70Tx-2, . . . , 70Tx-N and the individual second protocol transmit signal 75Tx-1, 75Tx-2, . . . , 75Tx-N.

Figure 4:
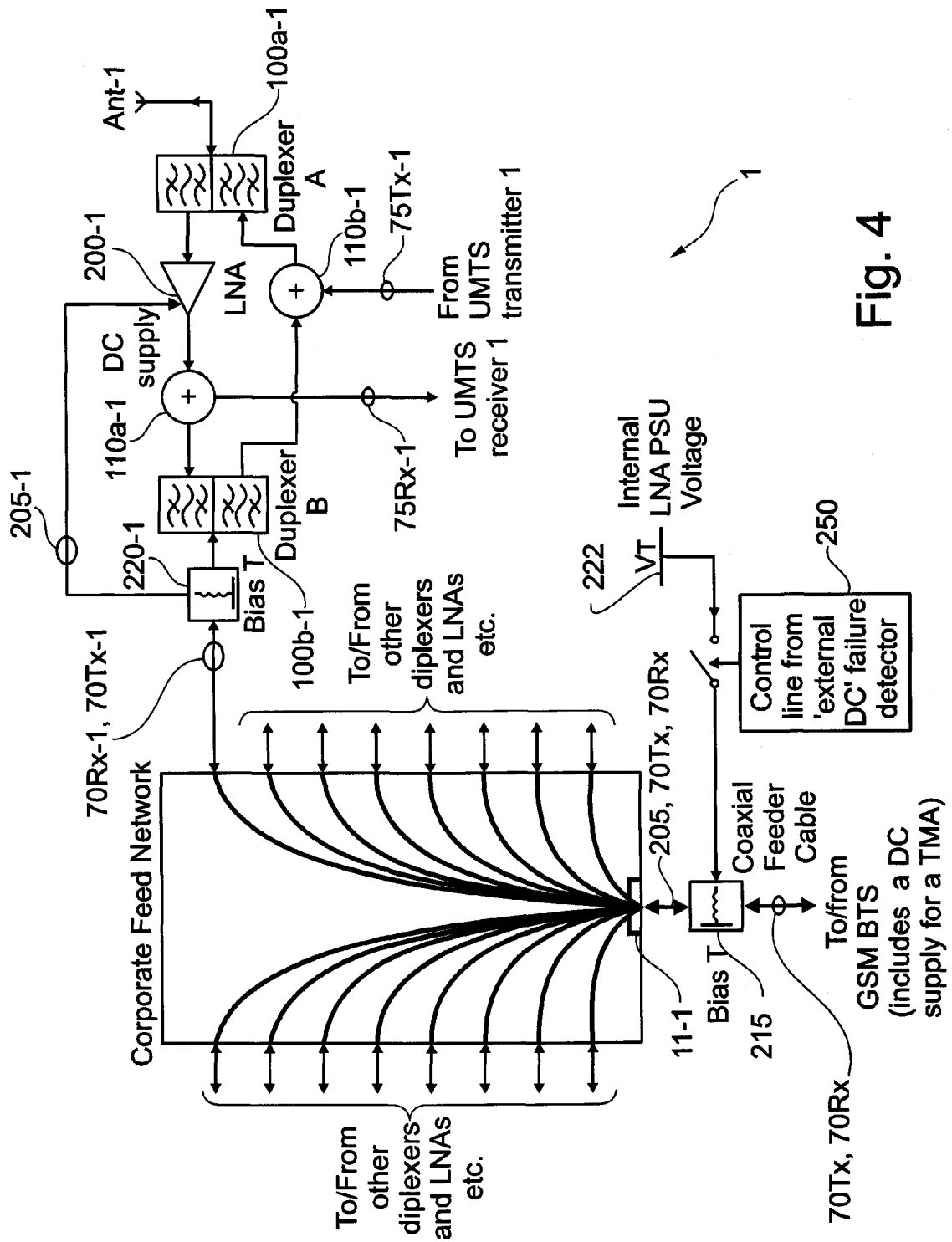
FIG. 4 shows details of the active antenna array

FIG. 4 shows a variant of the active antenna array 1 of the present disclosure. In FIG. 4 a second DC voltage supply 222 is provided. The second DC voltage supply 222 may be an internal power supply unit as is normally present within an active antenna array relaying the second protocol radio signals only, in the prior art.

Control means 250 are provided in order to monitor a first DC voltage present at the DC voltage adder 215. The control means 250 may further monitor the individual DC voltage 205-1, 205-2, . . . , 205-N. In addition the control means 250 may be adapted to control the second DC voltage supply 222. The second DC voltage supply 222 is adapted to provide the first DC voltage.

The second DC voltage supply 222 may be implemented as a back-up of the first DC voltage supply 202. Should the first DC voltage supply 210, or any of the individual voltages 205-1, 205-2, . . . , 205-N fail, this failure is recognized by the control means 250. The control means 250 switches from the first DC voltage supply 210 to the second voltage supply 222 in response to the failure.

It is possible for the first splitter 100a-1, 100a-2, . . . , 100a-N and the second splitter 100b-1, 100b-2, . . . , 100b-N to be identical. It is not necessary and may be advantageous from a cost and/or loss perspective to make the first splitter 100a-1, 100a-2, . . . , 100a-N and the second splitter 100b-1, 100b-2, . . . , 100b-N different in their filtering characteristics. The first splitter 100a-1, 100a-2, . . . , 100a-N needs to be a high-specification splitter since a performance of the second protocol receiver 210 partially depends on an accuracy of the first splitter 100a-1, 100a-2, . . . , 100a-N with respect to a filtering characteristic.

The second splitter 100b-1, 100b-2, . . . , 100b-N may not need as high a filtering performance as the first splitter 100a-1, 100a-2, . . . , 100a-N with respect to rejection of individual first protocol transmit signal 70Tx-1, 70Tx-2, . . . , 70Tx-N in the receive direction. The second splitter 100b-1, 100b-2, . . . , 100b-N is mainly required to protect the amplifier 200-1, 200-2, . . . , 200-N from damage possibly caused by the high power of the individual first protocol transmit signal 70Tx-1, 70Tx-2, . . . , 70Tx-N reaching the amplifier 200-1, 200-2, . . . , 200-N. It is possible to use a low-cost and a low-loss second splitter 100b-1, 100b-2, . . . , 100b-N forwarding in the transmit direction. The first protocol transmit signals 70Tx-1, 70Tx-2, . . . , 70Tx-N eventually reach the individual antenna element Ant-1, Ant-2, . . . , Ant-N for transmission.

Figure 5C:
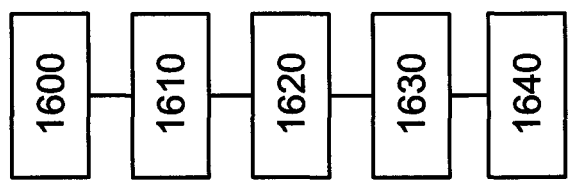
FIG. 5*c* shows details of a concurrently transmitting
Figure 5B:
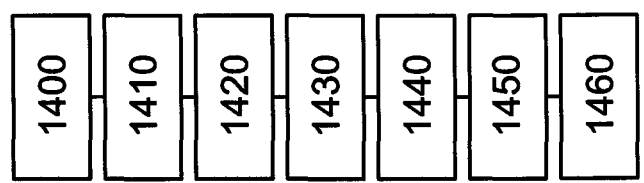
FIG. 5*b* shows details of a step of concurrently receiving
Figure 5A:
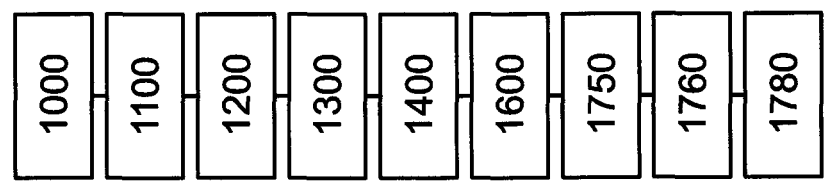
FIG. 5*a* shows a diagram for a method of providing a DC voltage

The present disclosure relates to a method 1000 of providing a DC voltage to an amplifier on an active antenna array for a mobile communication network as shown in FIGS. 5a-5c.

The method 1000 of FIG. 5a comprises a step 1100 of providing a first DC voltage. The first DC voltage may be provided by the first DC voltage supply 210 (see FIGS. 1, 3 and 4).

Figure 1:
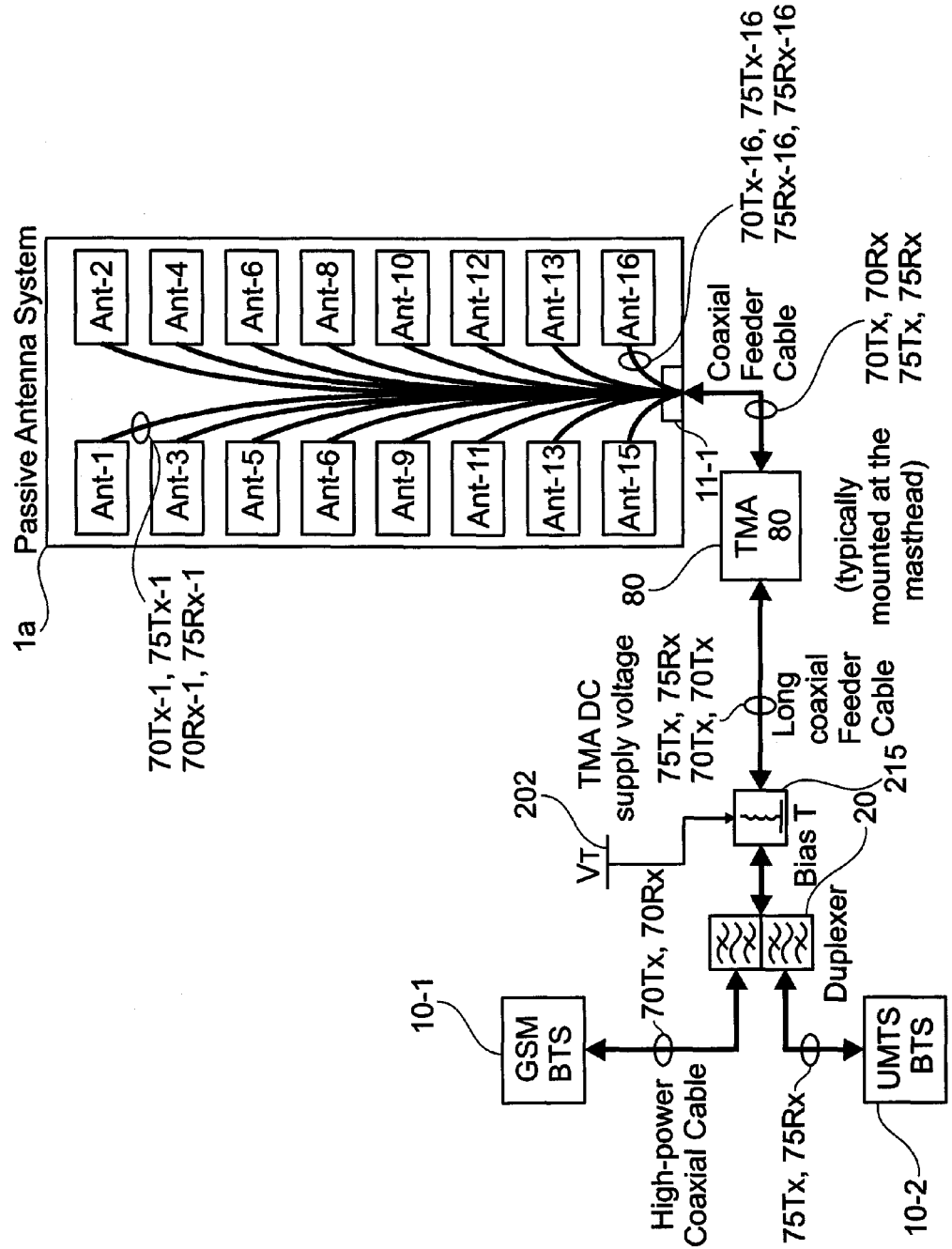
FIG. 1 shows an antenna array of the prior art

In a step 1200 the first DC voltage 205 is added to at least one portion of a first protocol relay path. The step 1200 of adding comprises using the DC voltage adder 215 (as seen in FIGS. 1, 3 and 4). The adding 1200 may comprise an adding to the first protocol link, for example the coaxial cable connected to the first port 11-1. The DC voltage adder 215 situated along the first protocol link, will provide the first DC voltage 205 to the portion of the first protocol relay path due to the connection of the first protocol link and the individual relay paths to the first port 11-1, via the passive feeder network.

A step 1300 comprises an extracting of at least one individual DC voltage 205-1, 205-2, . . . , 205-N from the at least one individual first protocol relay path, as discussed above. The at least one individual DC voltage 205-1, 205-2, . . . , 205-N supplies the at least one amplifier 200-1, 200-2, . . . , 200-N.

A step 1400 comprises a concurrently receiving of the individual first protocol receive signal 70Rx-1, 70Rx-2, . . . , 70Rx-N and the individual second protocol receive signal 75Rx-1, 75Rx-2, . . . , 75Rx-N. The concurrently receiving 1100 may use the individual one of the antenna element Ant-1, Ant-2, . . . , Ant-N, in FIG. 3 shown for the example of the antenna element Ant-1.

Details of the step 1400 are shown in FIG. 5b. A step 1410 comprises an amplifying of the individual first protocol receive signal 70Rx-1, 70Rx-2, . . . , 70Rx-N and the individual second protocol receive signal 75Rx-1, 75Rx-2, . . . , 75Rx-N.

The individual first protocol receive signal 70Rx-1, 70Rx-2, . . . , 70Rx-N and the individual second protocol receive signal 75Rx-1, 75Rx-2, . . . , 75Rx-N are forwarded in the receive direction in a step 1420.

In a step 1430 the individual first protocol receive signal 70Rx-1, 70Rx-2, . . . , 70Rx-N is extracted. The extracting 1430 may be implemented using the second splitter 100b-1, 100b-2, . . . , 100b-N. The extracting 1430 may comprise a filtering of the amplified signals generated in the amplifying step 1430. The filtering may be implemented using the second splitter 100b-1, 100b-2, . . . , 100b-N.

A step 1440 comprises an extracting of the individual second protocol receive signal 75Rx-1, 75Rx-2, . . . , 75Rx-N. The extracting 1430 may be implemented by the first coupler 110a-1, 110a-2, . . . , 110a-N. As mentioned before, the extracting 1430 may comprise a filtering of the individual first protocol receive signal 70Rx-1, 70Rx-2, . . . , 70Rx-N and the individual second protocol receive signal 75Rx-1, 75Rx-2, . . . , 75Rx-N after being amplified in the amplifying step 1200.

The filtering of individual second protocol radio signals 75Rx-1, 75Rx-2, . . . , 75Rx-N may without any limitation be implemented by the second protocol receiver 210 and/or the second protocol transceiver receiving the individual second protocol receive signal 75Rx-1, 75Rx-2, . . . , 75Rx-N. The second protocol transceiver is shown in outline in FIG. 3.

A step 1450 comprises a forming of the general first protocol receive signal 70Rx. The general first protocol receive signal 70Rx may be formed from the individual ones of the first protocol receive signals 70Rx-1, 70Rx-2, . . . , 70Rx-N by applying at least one of a phase weighting, an amplitude weighting or a delay to at least a selected one of the at least one individual first protocol receive signal 70Rx-1, 70Rx-2, . . . , 70Rx-N. Applying at least one of the phase weighting, the amplitude weighting or the delay is known in the art and may be implemented by the passive feeder network running from the first port 11-1 to the individual ones of the antenna elements Ant-1, Ant-2, . . . , Ant-N, but is not limited thereto. The phase weighting, the amplitude weighting or the delay are applied by analogue means.

A step 1460 comprises a forming of the general second protocol receive signal 75Rx. The general second protocol receive signal 75Rx may be formed from the individual ones of the second protocol receive signals 75Rx-1, 75Rx-2, ..., 75Rx-N by applying at least one of the variable phase weighting, the variable amplitude weighting or the variable delay to at least the selected one of the at least one individual second protocol receive signal 75Rx-1, 75Rx-2, ..., 75Rx-N. Applying at least one of the variable phase weighting, the variable amplitude weighting or the variable delay is known in the art for the individual second protocol receive signals 75Rx-1, 75Rx-2, ..., 75Rx-N and may be implemented using the second protocol receiver 210 (see FIG. 3) as mentioned above. The variable phase weighting, the variable amplitude weighting or the variable delay are applied by digital means.

The method 1000 further comprises a step 1600 of concurrently transmitting the individual first protocol transmit signal 70Tx-1, 70Tx-2, ..., 70Tx-N and the individual second protocol transmit signal 75Tx-1, 75Tx-2, ..., 75Tx-N. The individual one of the first protocol transmit signal 70Tx-1, 70Tx-2, ..., 70Tx-N and an individual one of the second protocol transmit signal 75Tx-1, 75Tx-2, ..., 75Tx-N may be combined using the second coupler 110*b*-1, 110*b*-2, ... 110*b*-N.

FIG. 5*c* shows details of the step 1600.

In a step 1610 at least one individual first protocol transmit signal 70Tx-1, 70Tx-2, ..., 70Tx-N is generated from the general first protocol transmit signal 70Tx. The individual first protocol transmit signal 70Tx-1, 70Tx-2, ..., 70Tx-N may be generated by applying at least one of a phase weighting, an amplitude weighting or a delay to the general first protocol transmit signal 70Tx. The applying of the phase weighting, amplitude weighting or the delay to the general first protocol transmit signal 70Tx is known in the art as beam forming. The antenna arrays 1*a* of the prior art may provide the phase weighting, the amplitude weighting or the delay by the passive feeder network running from the first port 11-1 to the individual antenna element Ant-1, Ant-2, ..., Ant-N (as shown in FIGS. 1, 3 and 4).

Typically, the phase weighting, the amplitude weighting or the delay between individual ones of the antenna elements Ant-1, Ant-2, ..., Ant-N is fixed for an antenna array 1*a* of the prior art. There may be a set of phase weightings, amplitude weightings or delays between individual ones of the antenna element Ant-1, Ant-2, ..., Ant-N in the prior art. The set of phase weightings, amplitude weightings or the delays may be provided using a set of passive phase shifters as known in the art. The passive phase shifters do typically not provide an arbitrary phase weighting, an arbitrary amplitude weighting or an arbitrary delay for the general first protocol transmit signal 70 Tx. Remote electrical tilt (RET) systems utilise electro-mechanically variable phase shift elements to vary a beam pattern relayed by the prior art antenna array 1*a*. RET systems will act on all transmit signals fed to the prior art antenna 1*a* and will not act separately for first protocol transmit signals 70Tx-1, 70Tx-2, ..., 70Tx-N and second protocol transmit signals 75Tx-1, 75Tx-2, ..., 75Tx-N.

A step 1620 comprises a generating of the individual second protocol transmit signals 75Tx-1, 75Tx-2, ..., 75Tx-N. The individual second protocol transmit signals is generated from the general second protocol transmit signal 75Tx by applying a variable phase weighting, a variable amplitude weighting or a variable delay to the general second protocol transmit signal 75Tx. The variable phase weighting, the variable amplitude or the variable delay are not limited by the use of passive phase shifters. In contrast the active antenna array 1 provides a larger flexibility with the variable phase weighting, the variable amplitude weighting or the variable delay than the passive phase shifters in the prior art. A beam forming for the individual second protocol transmit signals 75Tx-1, 75Tx-2, ..., 75Tx-N is of increased flexibility due to the variable phase weighting, the variable amplitude weighting or the variable delay. This process may well be implemented digitally rather than utilising the passive (analogue) feeder network referred to above. The variable phase weighting, the variable amplitude weighting or the variable delay may comprise a variation in time of at least one of the phase weighting, the amplitude weighting or the delay between the individual ones of the antenna elements.

The variable phase weighting, the variable amplitude weighting may also be provided by the multiplication of the relevant transmit and/or receive signal by 'beamforming vectors'. The 'beamforming vectors' are sets of coefficients which, when multiplied with the relevant transmit and/or receive signal, produce the required degree of at least one of the variable phase weighting, the variable amplitude weighting or the variable delay between individual ones of the antenna elements. Such multiplication may be provided vectorially, in either polar (amplitude and phase) format or in Cartesian (I/Q) format. In all cases, within the present disclosure, whenever (variable) phase weighting, (variable) amplitude weighting or (variable) delay are discussed, the use of 'beamforming vectors' to generate such modifications is explicitly included. Details about the concept of 'beamforming vectors' are given in an earlier application U.S. Ser. No. 12/563,693 entitled "Antenna array, network planning system, communication network and method for relaying radio signals with independently configurable beam pattern shapes using a local knowledge"; which is incorporated herein in its entirety.

In a step 1630 the individual first protocol transmit signal 70Tx-1, 70Tx-2, ..., 70Tx-N is forwarded in the transmit direction. The forwarding 1430 may be implemented using the second splitter 100*b*-1, 100*b*-2, ..., 100*b*-N as shown in FIG. 3.

In a step 1640 the individual second protocol transmit signal 75Tx-1, 75Tx-2, ..., 75Tx-N is added to the individual first protocol transmit signal 70Tx-1, 70Tx-2, ..., 70Tx-N. The step 1440 may be implemented using the second coupler 110*b*-1, 110*b*-2, ..., 110*b*-N as shown in FIG. 3.

The method 1000 further comprises a step 1750 of providing a second DC voltage supply 222 (see FIG. 1). As mentioned before the second voltage supply 222 is adapted to provide the first DC voltage 205. The second voltage supply 222 may further be adapted to provide the individual DC voltages 205-1, 205-2, ..., 205-N.

A step 1760 comprises a step of monitoring. The step of monitoring 1760 comprises monitoring at least one of the first DC voltage 205, individual DC voltage 205-1, 205-2, ..., 205-N or the first voltage supply 210.

A step 1780 comprises a switching between the first DC voltage supply 210 and the second DC voltage supply 222. The switching may be in response to a result of the step of monitoring 1760.

It is to be understood that the method 1000 of providing the DC voltage to at least one amplifier of an active antenna array 1 for a mobile communications network was explained only for one individual one of the amplifiers 200-1, 200-2, ..., 200-N. If there is more than one of the amplifiers 200-1, 200-2, ..., 200-N the method 1000, as explained with respect to FIGS. 5*a* to 54*c*, is applicable to each one of the relay paths terminated by the individual antenna elements Ant-1, Ant-2, ..., Ant-N and/or with the individual amplifier 200-1, 200-2, ..., 200-N present.

While various embodiments of the present invention have been described above, it should be understood that they have been presented by way of example, and not limitation. It will be apparent to persons skilled in the relevant arts that various changes in form and detail can be made therein without departing from the scope of the invention. In addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

Reference Numerals
1a prior art antenna array
1 active antenna array
2 Ant-1, Ant-2, ..., Ant-N at least one antenna element
10-1 first protocol BTS
10-2 second protocol BTS
11-1 first port
11-2 second port
100a-1, 100a-2, ..., 100a-N at least one first splitter
100b-1, 100b-2, ..., 100b-N at least one second splitter
200-1, 200-2, ..., 200-N at least one amplifier
202 DC voltage supply
215 DC voltage adder
220-1, 220-2, ..., 220-N DC voltage extractor
222 internal DC voltage supply
210 second protocol receiver or transceiver
70Tx general first protocol transmit signal
75Tx general second protocol transmit signal
70Rx general first protocol receive signal
75Rx general second protocol receive signal
70Rx-1, 70Rx-2, ..., 70Rx-N individual first protocol receive signal
70Tx-1, 70Tx-2, ..., 70Tx-N individual first protocol transmit signal
75Rx-1, 75Rx-2, ..., 75Rx-N individual second protocol receive signal
75Tx-1, 75Tx-2, ..., 75-Tx-N individual second protocol transmit signal
110a-1, 110a-2, ..., 110a-N at least one first coupler
110b-1, 110b-2, ..., 110b-N at least one second coupler
1000 method providing a DC voltage to an amplifier of an active antenna array for a mobile communications network
1400 concurrently receiving individual first protocol and individual second protocol receive signals
1410 amplifying individual first protocol and individual second protocol receive signals
1420 forwarding individual first and second protocol receive signals
1430 extract individual first protocol receive signal
1440 extract individual second protocol receive signal
1450 forming first general receive signal
1460 forming second general receive signal
1600 concurrently transmitting first and second protocol receive signals
1610 generate individual first protocol transmit signal 70Tx-1, 70Tx-2, ..., 70Tx-N
1620 generate individual second protocol transmit signal
1630 adding individual second protocol transmit signal
1640 forwarding transmit signals
1750 provide second DC voltage supply
1760 monitoring DC voltages
1780 switching of DC voltages in response to monitoring

The invention claimed is:

1. An active antenna array for a mobile communication network comprising:
   a plurality of antenna elements for relaying at least first protocol radio signals wherein at least a subset of the plurality of antenna elements are further adapted to relay second protocol radio signals
   at least one first port connected to at least one individual first protocol relay path; the first port relaying a general first protocol receive signal to a first protocol link;
   a first DC voltage supply providing a first DC voltage to at least a portion of the first protocol link;
   at least one DC voltage extractor located in the at least one individual first protocol relay path, the DC voltage extractor being adapted to extract at least one individual DC voltage to supply at least one signal processing element located in the at least one individual first relay path;
   at least one first splitter located in the at least one individual first protocol relay path, the at least one first splitter being adapted to forward at least one of the at least one individual first protocol receive signals and the at least one individual second protocol receive signal in a receive direction from the plurality of antenna elements to an at least one amplifier;
   the at least one first splitter further being adapted to forward at least one individual first protocol transmit signal in a transmit direction; and
   at least one second coupler adding at least one individual second protocol transmit signal to the at least one individual first protocol transmit signal.

2. The active antenna array according to the claim 1, further comprising a DC voltage adder coupling the first DC voltage to the portion of the first protocol link.

3. The active antenna array according to claim 1, wherein the at least one signal processing element is an amplifier.

4. The active antenna array according to claim 3, wherein at least one first coupler forwards the at least one individual second protocol receive signal to an at least one second protocol receiver.

5. The active antenna array according to claim 4, wherein the at least one first protocol transmit signal is generatable from the general first protocol transmit signal at the first port by applying at least one of a phase weighting, an amplitude weighting, or a delay to the general first protocol transmit signal; and wherein the at least one individual second protocol transmit signal is generatable from the general second protocol transmit signal at a second port by applying at least one of a variable phase weighting, a variable amplitude weighting, or a variable delay to the general second protocol transmit signal.

6. The active antenna array according to claim 4, wherein the plurality of antenna elements is adapted for at least one of concurrently transmitting the at least one individual first protocol transmit signal and the at least one individual second protocol transmit signal or concurrently receiving the at least one individual first protocol receive signal and the at least one individual second protocol receive signal.

7. The active antenna array according to claim 1, wherein the signal processing element amplifies at least one of an at least one first protocol receive signal and an at least one second protocol receive signal.

8. The active antenna array according to claim 1, comprising at least one second splitter located in the at least one individual first protocol relay path for forwarding the first protocol transmit signal in a transmit direction to the first splitter.

9. The active antenna array according to claim 1, wherein the at least one of first splitter or the at least one second splitter are selected from the group consisting of a duplexer, a directional coupler, a circulator and a quadrature hybrid.

10. The active antenna array according to claim 1, comprising:
a second DC voltage supply adapted to provide the at least one individual voltage;
control means adapted to monitor at least one of the first DC voltage supply, the at least one individual DC voltage or the second DC voltage supply, and further adapted to switch between the first DC voltage supply, and the second DC voltage supply.

11. The active antenna array according to claim 1, wherein the at least one first port is further adapted to relay the general first protocol transmit signal to the individual ones of the first protocol relay paths; and wherein the second port is adapted to provide the general second protocol receive signal and a general second protocol transmit signal.

12. The active antenna array according to claim 1, wherein the first protocol pertaining to the first protocol radio signals is selected from the group consisting of a GSM protocol and an UMTS protocol.

13. The active antenna array according to claim 1, wherein the second protocol pertaining to the second protocol radio signal is selected from the group consisting of an UMTS protocol, a third generation long term evolution radio protocol, a Freedom of Mobile Multimedia Access radio protocol, a wideband Code Division Multiple Access radio protocol and a worldwide interoperability for Microwave Access protocol.

14. The active antenna array according to claim 1, wherein the at least one second coupler forwards at least one of the at least one individual first protocol transmit signal or the at least one individual second protocol transmit signal to the first splitter.

15. The active antenna array according to claim 1, adapted to provide at least one of a variable phase weighting, a variable amplitude weighting, or a variable delay to the at least one individual second protocol receive signal forming the general second protocol receive signal by digital means.

16. The active antenna array according to claim 1, adapted to provide at least one of a phase weighting, an amplitude weighting or a delay to the at least one individual first protocol receive signal forming the general first protocol receive signal by analogue means.

17. A method of providing a DC voltage to at least one signal processing element of an active antenna array-for a mobile communications network, the method comprising:
providing a first DC voltage;
adding the first DC voltage to at least one portion of a first protocol relay path;
extracting at least one individual DC voltage from at least one individual first protocol relay path, the at least one individual DC voltage supplying at least one signal processing element located in the at least one individual first protocol relay path;
concurrently receiving at least one individual first protocol receive signal and at least one individual second protocol receive signal;
amplifying the at least one individual first protocol receive signal and the at least one individual second protocol receive signal;
forwarding the at least one individual first protocol receive signal and the at least one individual second protocol receive signal in a receive direction:
extracting the at least one individual first protocol receive signal;
extracting the at least one individual second protocol receive signal.

18. The method according to claim 17, the concurrently receiving further comprising:
forming a general first protocol receive signal from the at least one individual first protocol receive signal by applying at least one of a phase weighting, an amplitude weighting, or a delay to at least a selected one of the at least one individual first protocol receive signal by analogue means; and
forming a general second protocol receive signal from the at least one individual second protocol receive signal by applying at least one of a variable phase weighting, a variable amplitude weighting or a variable delay to the at least one individual second protocol receive signal by digital means.

19. The method according to claim 17, comprising:
concurrently transmitting at least one individual first protocol transmit signal and at least one individual second protocol transmit signal.

20. The method according to claim 19, the concurrently transmitting comprising:
generating the at least one individual first protocol transmit signal from a general first protocol transmit signal by applying at least one of a phase weighting, an amplitude weighting, or a delay to the general first protocol transmit signal by analogue means;
generating at least one individual second protocol transmit signal from a general second protocol transmit signal by applying a variable phase weighting, a variable amplitude weighting, or a variable delay to the general second protocol transmit signal by digital means;
forwarding the at least one individual first protocol transmit signal in a transmit direction; and
adding the at least one individual second protocol transmit signal to the at least one individual first protocol transmit signal.

21. The method according to claim 17, further comprising:
providing a second DC voltage adapted to provide the at least one individual DC voltage;
monitoring at least one of the first DC voltage, the second DC voltage or the at least one individual DC voltage; and switching between the first DC voltage and the second DC voltage in response to the monitoring.

22. A computer program product comprising a computer usable non-transitory medium having control logic stored therein for causing a computer to manufacture an active antenna array for a mobile communications network, the active antenna array comprising:
   a plurality of antenna elements for relaying at least first protocol radio signals;
   at least one first port connected to at least one individual first protocol relay path; the at least one first port relaying a general first protocol receive signal to a first protocol link;
   a first DC voltage supply providing a first DC voltage to at least a portion of the first protocol link;
   at least one DC voltage extractor located in the at least one individual first protocol relay path; the DC voltage extractor being adapted to extract at least one individual DC voltage to supply an at least one processing element located in the at least one individual first protocol relay path
   at least one first splitter located in the at least one individual first protocol relay path, the at least one first splitter being adapted to forward at least one of the at least one individual first protocol receive signals and the at least one individual second protocol receive signal in a receive direction from the plurality of antenna elements to an at least one amplifier;
   the at least one first splitter further being adapted to forward at least one individual first protocol transmit signal in a transmit direction; and
   at least one second coupler adding at least one individual second protocol transmit signal to the at least one individual first protocol transmit signal.

23. A computer program product comprising a computer usable non-transitory medium having control logic stored therein for causing a computer to execute a method of providing a DC voltage to at least one processing element of an active antenna array, the control logic comprising:
   first computer readable program code means for causing the computer to provide a first DC voltage;
   second computer readable program code means for causing the computer to add the first DC voltage to at least one portion of a first protocol relay path;
   third computer readable program code means for causing the computer to extract at least one individual DC voltage from at least one individual first protocol relay path for supplying the at least one processing element
   fourth computer readable program code means for causing the computer to forward at least one of the at least one individual first protocol receive signals and one of the individual second protocol receive signal in a receive direction from the plurality of antenna elements to an at least one amplifier;
   fifth computer readable program code means for causing the computer to forward at least one individual first protocol transmit signal in a transmit direction; and
   sixth computer readable program code for causing the computer to add at least one individual second protocol transmit signal to the at least one individual first protocol transmit signal.

24. A chipset for controlling an active antenna array for a mobile communications network, the chipset comprising:
   a first port connected to at least one individual first protocol relay path;
   the first port relaying a general first protocol receive signal to a first protocol link;
   a first DC voltage supply providing a first DC voltage to at least a portion of the first protocol link;
   at least one DC voltage extractor located in the at least one individual first protocol relay path; the DC voltage extractor being adapted to extract at least one individual DC voltage to supply an at least one signal processing element
   at least one first splitter located in the at least one individual first protocol relay path, the at least one first splitter being adapted to forward at least one of the at least one individual first protocol receive signals and the at least one individual second protocol receive signal in a receive direction from the plurality of antenna elements to an at least one amplifier;
   the at least one first splitter further being adapted to forward at least one individual first protocol transmit signal in a transmit direction; and
   at least one second coupler adding at least one individual second protocol transmit signal to the at least one individual first protocol transmit signal.

* * * * *